US006038491A

United States Patent [19]

McGarry et al.

[11] Patent Number: 6,038,491

[45] Date of Patent: Mar. 14, 2000

[54] MONITORING AND REPORTING SYSTEM USING CELLULAR CARRIERS

[75] Inventors: Patrick J. McGarry, West Chester; Philip René Reger, Newtown Square, both of Pa.

[73] Assignee: Mars, Incorporated, McLean, Va.

[21] Appl. No.: 08/978,811

[22] Filed: Nov. 26, 1997

[51] Int. Cl.[7] .................................................... G06F 17/00

[52] U.S. Cl. .......................... 700/231; 700/241; 700/236; 700/244

[58] Field of Search ......................... 364/479.01, 479.06, 364/479.11, 479.14; 340/825.35; 235/381; 221/9; 369/24; 379/39, 40, 42; 455/404, 422; 700/231, 236, 241, 237, 244

[56] References Cited

U.S. PATENT DOCUMENTS

| | | | |
|---|---|---|---|
| 4,241,237 | 12/1980 | Paraskevakos et al. | 179/2 AM |
| 4,412,292 | 10/1983 | Sedam et al. | 364/479 |
| 5,091,713 | 2/1992 | Horne et al. | 340/541 |
| 5,222,583 | 6/1993 | Bergmann et al. | 194/206 |
| 5,272,747 | 12/1993 | Meads | 379/59 |
| 5,442,568 | 8/1995 | Ostendorf et al. | 364/479 |
| 5,454,024 | 9/1995 | Lebowitz | 379/40 |
| 5,553,083 | 9/1996 | Miller | 371/32 |
| 5,564,108 | 10/1996 | Hunsaker et al. | 395/800 |
| 5,591,949 | 1/1997 | Bernstein | 235/380 |
| 5,605,506 | 2/1997 | Hoorn et al. | 463/47 |
| 5,608,643 | 3/1997 | Wichter et al. | 364/479.14 |
| 5,608,778 | 3/1997 | Partridge, III | 379/58 |
| 5,699,328 | 12/1997 | Ishizaki et al. | 369/24 |
| 5,787,149 | 7/1998 | Yousefi et al. | 455/422 |

FOREIGN PATENT DOCUMENTS

| | | |
|---|---|---|
| 2 755 776 | 5/1998 | France . |

*Primary Examiner*—William Grant
*Assistant Examiner*—Steven R. Garland
*Attorney, Agent, or Firm*—Fish & Richardson P.C.

[57] ABSTRACT

A vending machine capable of communicating with a central station using any one of multiple cellular carriers includes a telemetry device. The telemetry device includes a cellular transceiver, a digital signal processor-based modem, and memory storing software corresponding to protocols for each of the cellular carriers. The telemetry device can be reconfigured, in response to signals received from the central station using a first one of the cellular carriers, to transmit and receive signals subsequently using a second one of the cellular carriers. Software code residing in memory associated with a sub-unit of a vending machine can also be upgraded or otherwise modified by transmitting segments of software code from a remote station to a telemetry device in the vending machine using a cellular carrier, assembling the segments of software code in the telemetry device, and routing the assembled software code to a designated one of the sub-units of the vending machine.

40 Claims, 7 Drawing Sheets

MONITORING AND REPORTING SYSTEM USING CELLULAR CARRIERS

BACKGROUND OF THE INVENTION

The present invention relates generally to monitoring and reporting systems using cellular carriers.

Various forms of monitoring and reporting systems are often associated with vending machines. Such systems can provide periodic monitoring and reporting of various occurrences within the machines, such as inventory changes, maintenance requirements, service calls, cash receipts, demand for specific products, sold-out conditions, and various alarm conditions, among others.

Some monitoring and reporting systems include a central computer complex which receives data from multiple vending machines at remote locations. In such systems, a communication link is established between the central computer and the individual machines through the use, for example, of standard telephone lines or radio communications. At predetermined intervals, each vending machine accesses the communication link and calls the central computer. Once communication is established, the vending machine can transmit pertinent information about its status. Such systems can help eliminate unnecessary service calls and facilitate better supply route planning. The monitoring and reporting systems can lead to improved auditing practices as well as increased sales.

The use of cellular communication systems has become increasingly popular for general telecommunications because such systems offer several advantages over land-based telephone lines and other radio links. It is desirable to extend the use of such communication systems to vending machine monitoring and reporting systems.

Currently, however, various cellular carriers exist for cellular data communication systems. Such carriers include, for example, RAM Mobitex, ARDIS/DATA-TAC, Cellular Digital Packet Data ("CDPD"), and Circuit Switched Cellular ("CSC"). Each of those systems operates using its own protocol as well as different frequencies or frequency ranges for transmitting and receiving signals. Thus, for example, CDPD and CSC operate with a transmit frequency in the range of 824–849 megahertz ("MHz") and a receive frequency in the range of 869–894 MHz. RAM Mobitex, on the other hand, uses a transmit frequency in the range of 896–902 MHz and a receive frequency in the range of 935–941 MHz; ARDIS/DATA-TAC uses a transmit frequency in the range of 806–849 MHz and a receive frequency in the range of 851–869 MHz.

Based on actual or perceived advantages or disadvantages of one cellular carrier with respect to other cellular carriers, owners or operators of vending machine networks may wish to select a particular cellular carrier to support the vending machine monitoring and reporting system. However, each vending machine in the system must be designed with a telemetry device capable of transmitting and receiving information using the specified frequency ranges according to the particular cellular carrier protocol. This requirement is further complicated because the machines in the vending machine monitoring and reporting system may differ from one another. It is, therefore, desirable to provide a standard vending machine telemeter device which can be adapted for use with any one of multiple cellular carriers and which can be incorporated easily into vending machines of different types.

SUMMARY OF THE INVENTION

In general, in one aspect, the invention features a telemetry device for use in a monitoring system. The telemetry device includes a cellular transceiver, a digital signal processor-based modem, and memory storing software corresponding to protocols for a plurality of cellular carriers. The telemetry device is configurable to provide monitored information to a central station using a first one of the cellular carriers, and wherein the telemetry device can be reconfigured, in response to signals received from the central station using the first cellular carrier, to transmit and receive signals subsequently using a second one of the cellular carriers.

In another aspect, the invention features a vending machine capable of communicating with a central station using any one of multiple cellular carriers. The vending machine includes a telemetry device having a cellular transceiver, a digital signal processor-based modem, and memory storing software corresponding to protocols for each of the cellular carriers. The telemetry device can be reconfigured, in response to signals received from the central station using a first one of the cellular carriers, to transmit and receive signals subsequently using a second one of the cellular carriers. The invention also features a monitoring and reporting system including a central station and a plurality of vending machines as described above.

In various implementations, the invention includes one or more of the following features. The vending machine can include a processor configured to accumulate data corresponding to monitored events occurring in the vending machine. The digital signal processor-based modem is configured to transmit the accumulated data to the central station via the cellular transceiver. The processor can be configured to accumulate data corresponding to monies deposited in and returned from the vending machine, inventory remaining in the vending machine, alarm conditions in the vending machine, as well as other vending machine data.

The cellular transceiver can include frequency band filters which can be adjusted so that the cellular transceiver transmits and receives signals in frequency ranges of a selected one of the cellular carriers. The cellular transceiver can include a transmitter and a receiver each of which has at least one associated adjustable frequency band filter. The frequency band filters can include, for example, multiple surface acoustic wave filters or voltage-tuned band pass filters.

The cellular transceiver can include an antenna, a transmitter, a receiver, and a switch configured to allow the cellular transceiver to transmit and receive signals using a half duplex carrier or a duplexer configured to allow the cellular transceiver to transmit and receive signals using a duplex carrier. The cellular transceiver can also be configured to allow transmission and reception with both duplex and half duplex carriers.

The invention also features a method of communicating information between a central station and a vending machine comprising a telemetry device. The method includes transmitting an identification code corresponding to a second cellular carrier from the central station to the vending machine using a first cellular carrier, and reconfiguring the telemetry device automatically, in response to the step of transmitting, to transmit and receive subsequent communications to and from the central station using the second cellular carrier.

Data from the vending machine can be accumulated and transmitted to the central station using the second cellular carrier.

Additionally, reconfiguring the telemetry device can include accessing software code stored in memory in the telemetry device, wherein the stored software code corresponds to a protocol for use with the second cellular carrier. Reconfiguring the telemetry device can also include adjusting band pass filters associated with a cellular transceiver in the telemetry device. The filters can be arranged so that the transceiver transmits and receives information on frequencies corresponding to the second cellular carrier.

In general, in another aspect, the invention features a method of modifying, supplementing or replacing software code residing in memory associated with one of multiple sub-units of a vending machine. The method includes transmitting segments of software code from a remote station to a telemetry device in the vending machine using a cellular carrier, assembling the segments of software code in the telemetry device, and routing the assembled software code to a designated one of the sub-units of the vending machine.

In various implementations, the invention features one or more of the following features. The assembled software can be routed, for example, to a coin mechanism, a bill validator or an electronic cash device in the vending machine to update existing software in the coin mechanism, the bill validator or the electronic cash device, respectively. The assembled software can also be routed to a vend operation control system in the vending machine to update existing software in the vend operation control system. The method can be used to upgrade or modify software code associated with other sub-units in the vending machine as well.

In a related aspect, the invention features a method of modifying, supplementing or replacing software code residing in memory in a vending machine. The method includes transmitting segments of software code from a remote station to a telemetry device in the vending machine using a cellular carrier, assembling the segments of software code in the telemetry device, and reconfiguring the vending machine so that at least some old software code is no longer accessed during subsequent vending machine operations.

The method can include storing the assembled software code in a currently unused memory bank of the vending machine and swapping memory banks containing the old software code and the assembled software code. Moreover, even software code relating to operation of the telemetry device can be replaced by upgraded software code.

In yet a further aspect, the invention features a vending machine capable of communicating with a central station using a cellular carrier. The vending machine includes a telemetry device having a cellular transceiver coupled to a digital signal processor-based modem, and an antenna coupled to the cellular transceiver. The vending machine further includes a human perceivable indicator coupled to the telemetry device. Signals associated with the human perceivable indicator are indicative of the quality of signal reception by the antenna.

In one implementation, the light emitting device can be a light emitting diode having a blink rate controlled by the telemetry device in response to a receiver signal strength indication.

The invention also includes a method of servicing a vending machine capable of communicating with a central station using a cellular carrier, where the vending machine includes a telemetry device having a cellular transceiver and an antenna coupled to the cellular transceiver. The method includes receiving an external signal in the cellular transceiver, generating a receiver signal strength indication in the telemetry device based on the received signal, controlling a blink rate of a light emitting device based on the receiver signal strength indication, and positioning the antenna based on the blink rate.

In a further aspect, the invention features a vending machine capable of communicating with a central station using a cellular carrier and including a cellular transceiver coupled to a planar antenna, a processor configured to accumulate data corresponding to monitored events occurring in the vending machine, and a digital signal processor-based modem coupled to the cellular transceiver and to the processor. The digital signal processor-based modem is configured to transmit the accumulated data to the central station via the cellular transceiver. The planar antenna can be designed into the top or a side of the vending machine.

In various implementations, the invention provides one or more of the following advantages. For example, a vending machine can report accumulated data to a remote location using different cellular carriers at different times depending, for example, on the relative cost of using the carriers or the various other advantages the carriers offer. Changing carriers can be performed remotely without a field call by service personnel. The invention, thus, allows one to switch carriers as often as desired.

The invention also provides a technique for remotely upgrading, or otherwise modifying or replacing, software code associated with various vending machine functions. The software upgrade also can be performed on multiple vending machines without requiring service personnel to visit each machine. Thus, software upgrades or changes can be made more quickly to provide improved vending machine operation and better customer satisfaction. Moreover, software upgrades can be accomplished with minimal interruption of normal vending operations.

The techniques discussed above and described in greater detail below can provide a more efficient use of service personnel and can improve the quality of information gathering associated with vending machine networks.

The invention also provides a technique to assist service personnel to correct antenna reception difficulties when they are required to make an on-site visit to a vending machine. In addition, use of a planar antenna can reduce the likelihood of vandalism to the antenna as well as reduce accidental damage to the antenna. Moreover, the use of a flat antenna does not detract from the overall outer appearance of the vending machine.

Additional features and advantages of the invention will be readily apparent from the following description, drawings and claims.

DESCRIPTION OF THE PREFERRED EMBODIMENTS

Figure 1:
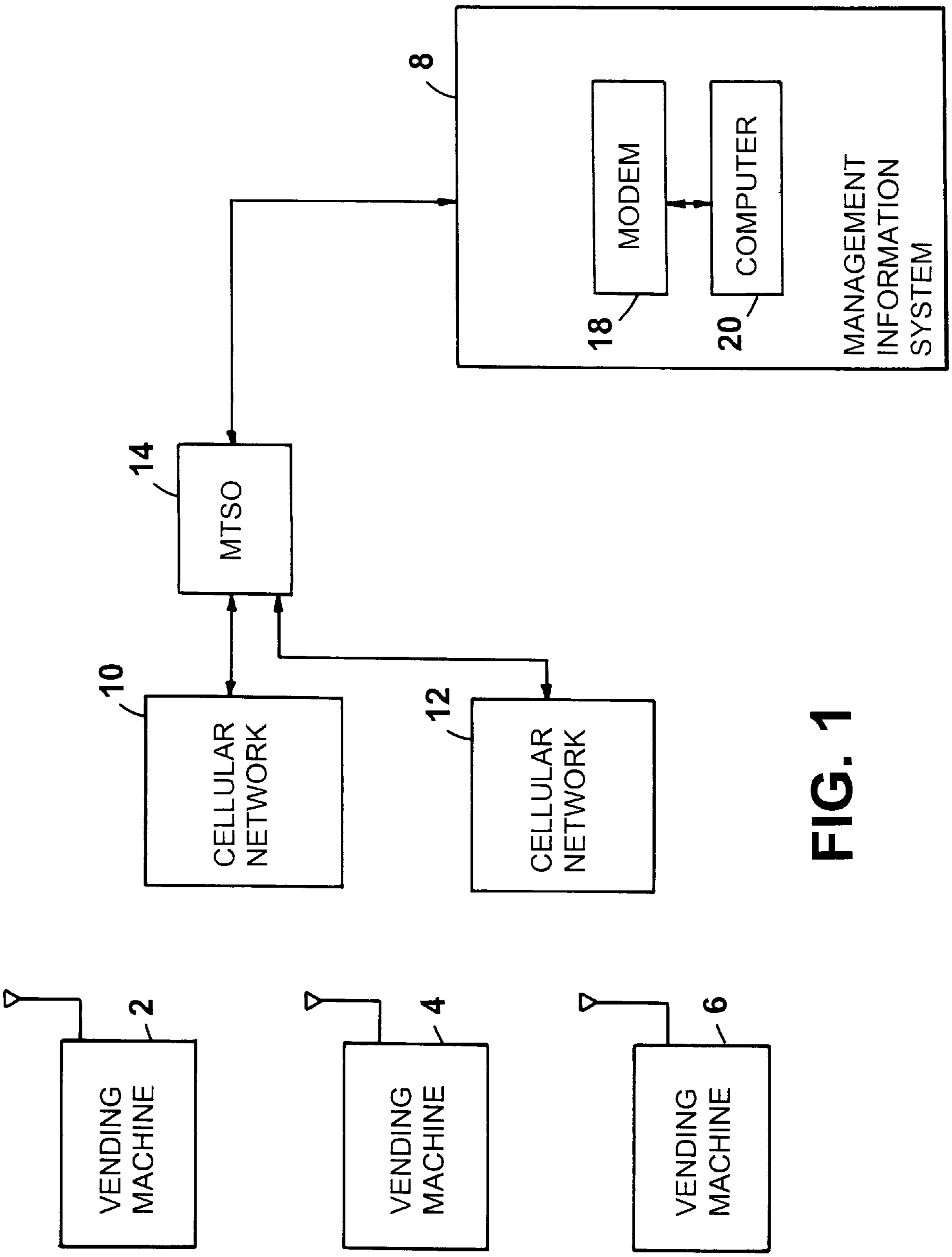
FIG. 1 is a block diagram of a vending machine monitoring and reporting system according to the invention.

FIG. 1 illustrates multiple vending machines 2, 4 and 6, each of which includes a telemetry device as explained in greater detail below. As used in the following description, the term "vending machine" includes, but is not limited to, machines for vending beverages, snacks, candies, toiletries, toys or other items as well as machines for providing services, such as an ATM machine or a kiosk. The vending machines 2, 4 and 6 can communicate with a remote central computer station or information management system 8 via one of several cellular networks 10, 12 connected by a Mobile Telephone Switching Office ("MTSO") 14. Each cellular network 10, 12 is associated with a different one of several cellular carriers or network providers. Each cellular network 10, 12 includes one or more cell sites which can re-transmit received signals.

The information management system 8 functions as a central monitoring station which periodically receives status reports from the various vending machines 2, 4 and 6 and processes the received information. The information management system 8 can also request status reports from the vending machines 2, 4 and 6 and can instruct the vending machines to perform other functions, such as switching from one cellular carrier to another and modifying software code in the vending machine, as further explained below. As shown in FIG. 1, the information management system 8 includes a modem 18 and a computer 20. The modem, however, can be separate from the information management system 8. Moreover, in some implementations, the management information system 8 includes multiple computers or processors.

Figure 2:
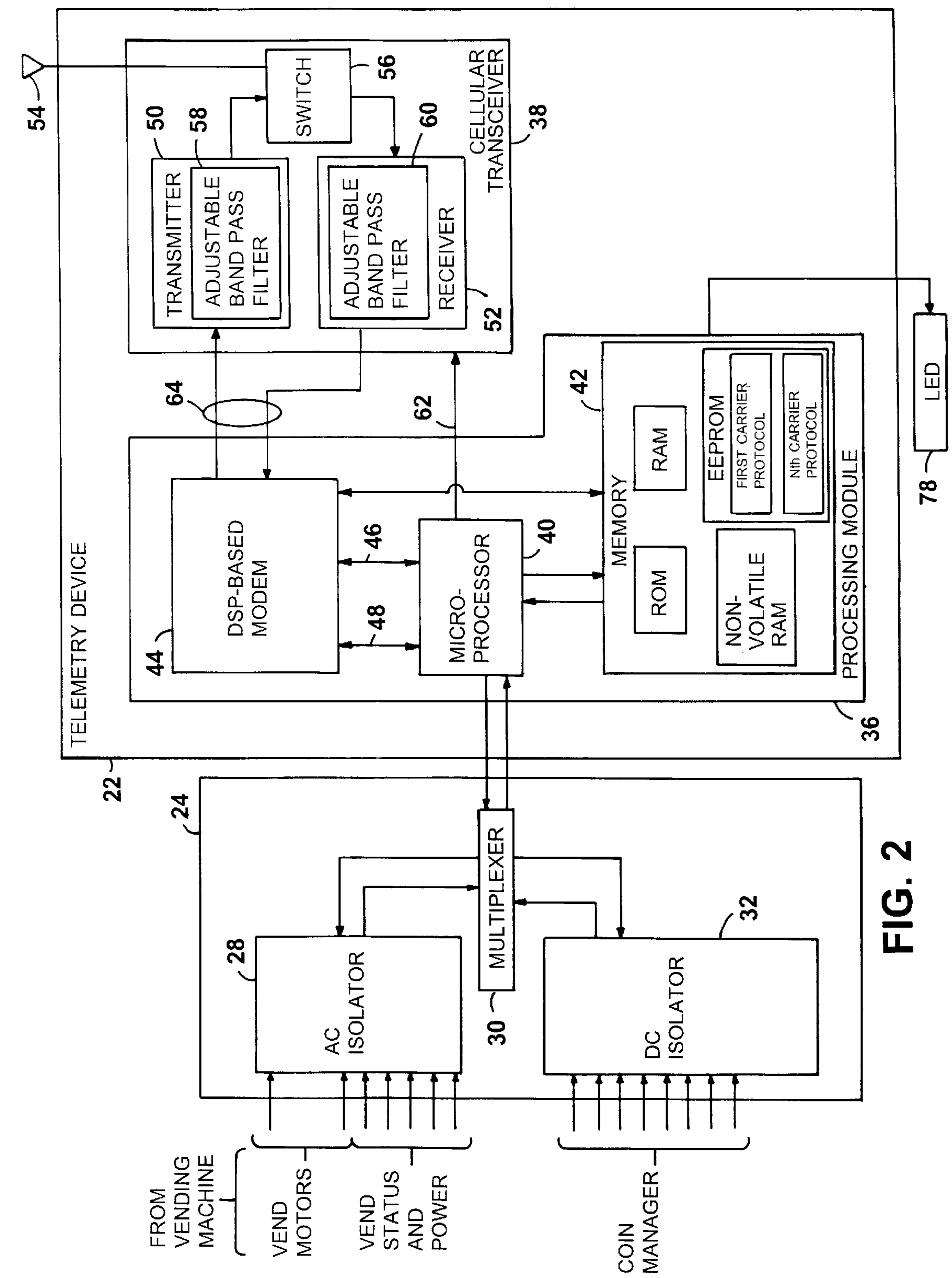
FIG. 2 is a block diagram of a telemetry device and vending machine interface board according to the invention.

FIG. 2 shows a block diagram of a telemetry device 22 which can be incorporated into any one of the vending machines, for example, vending machine 2. A customized circuit board 24 is also provided as an interface between various other components of the vending machine 2 and the telemetry device 22.

The design of the circuit board 24 can be tailored to the particular vending machine 2 with which it is to be used. Input ports on the circuit board 24 are connected to locations in the vending machine so as to monitor selected signals or other events that occur within the vending machine. In general, the circuit board 24 is designed to monitor various signals, some of which are related to the occurrence of a single event and some of which are related to a combination or sequence of events. For example, the condition of respective vend motors or solenoids, which are used for dispensing a selected product, can be monitored to provide an indication of which products are being vended. The vend motor or solenoid signals can be fed through an AC optical isolator 28 to a multiplexer 30 as described, for example, in U.S. Pat. No. 4,412,292, which is incorporated herein by reference in its entirety. Vend status and power inputs, "sold-out" indicator signals, "correct-change only" signals, "vend relay" signals and other selected AC signals can also be fed through the AC optical isolator 28 to the multiplexer 30. Similarly, other signals from the vending machine 2 are fed through a DC optical isolator 32 to the multiplexer 30 as described, for example, in the aforementioned U.S. Pat. No. 4,412,292. Such DC signals can include signals generated by a coin changer mechanism when coins of various denominations are received in the vending machine 2 or when coins are returned as change from the machine 2. Other AC and/or DC signals or events in the vending machine can be monitored as well depending on the particular goals for the monitoring and reporting system. Generally, the monitored signals provide the capability of determining the status of vending machine product inventory and the amount of currency in the vending machine, as well as various alarms or other conditions at any given time.

Output ports on the circuit board 24 are designed to provide standardized connections to inputs on the telemetry device 22. In one implementation, outputs from the multiplexer 30 on the circuit board 24 are fed directly to a processing module 36 on the telemetry device 22. In such an implementation, processing of the monitored signals that takes place within the vending machine occurs on the telemetry device 22 rather than on the circuit board 24. This allows the circuit board 24 to be manufactured relatively inexpensively using a simple design.

The telemetry device 22 includes the processing module 36 and a cellular transceiver 38. The processing module 36 has a microprocessor 40, memory 42 and a digital signal processor-based ("DSP-based modem") 44. One suitable DSP-based modem is a model XJ1560, available from U.S. Robotics, Inc. The memory 42 includes non-volatile memory such as read-only-memory ("ROM"), and volatile memory, such as random access memory ("RAM"). The memory 42 can include other forms of memory, such as non-volatile random access memory for storing information such as carrier identification codes, an electronic serial number of the telemetry device 22, and a system identification code. In addition, the memory 42 can include "flash memory," such as electrically erasable programmable read-only memory ("EEPROM").

As signals in the vending machine 2 are monitored by the control board 24, they are passed to the microprocessor 40. The microprocessor 40 is configured to accumulate and process the received signals according to a software program or code stored in ROM. The microprocessor 40 stores, in RAM, specified data about the status of the vending machine 2 based on the processed signals. As noted above, in one implementation the stored data relates to the status of vending machine product inventory and the amount of currency stored in the vending machine 2.

The DSP-based modem 44, which is coupled to the microprocessor 40 as well as to the memory 42, serves several functions. First, the DSP-based modem 44 performs audio signal processing functions. Second, the DSP-based modem 44 performs modem signaling functions according to a previously selected one of several cellular communication protocols. Software or code corresponding to the available communication protocols is stored in the flash memory included in the memory 42. In one implementation, for example, the available cellular communication protocols stored in the memory 42 include CDPD, RAM Mobitex and ARDIS/DATA-TAC. The DSP-based modem 44 also performs data compression and decompression functions with respect to outgoing and incoming data signals, respectively. The microprocessor 40 and DSP-based modem 44 are connected by digital input and output lines 46 and control lines 48. Although the microprocessor 40 and DSP-based modem 44 are shown in FIG. 2 as separate components, they may be formed as a single integrated unit or integrated circuit chip.

The cellular transceiver 38 includes a transmitter 50 and a receiver 52. In one implementation, the transmitter 50 is a gallium arsenide ("GaAs") monolithic integrated circuit RF power amplifier capable of handling the entire range of transmitter frequencies associated with the available cellular communication networks. Similarly, in one implementation, the receiver 52 is a GaAs monolithic integrated circuit capable of handling the entire range of receiver frequencies associated with the available cellular communication networks. As in other standard transceivers, the cellular transceiver 38 includes UHF and VHF voltage-controlled oscillators. In some implementations, however, the frequency range of the UHF voltage-controlled oscillator may need to be adjusted, for example, by the addition of an extra varactor tuning element, depending on the range of the transmission and reception frequencies associated with the available cellular carriers.

An antenna 54 is coupled to the transmitter 50 and receiver 52 through a transmitter-receiver switch 56 which allows half duplex systems, such as RAM Mobitex and ARDIS/DATA-TAC, to be used. The switch 56, which can be a single pole, double throw switch, switches the connection of the antenna 54 between the transmitter 50 and receiver 52.

The transmitter 50 and receiver 52 each have one or more bandpass filters 58, 60 associated with them, respectively. The band pass filters 58, 60 can be switched or tuned automatically to correspond to the transmitter and receiver frequency ranges associated with individual cellular carriers. In one implementation, for example, each of the band pass filters 58, 60 is a switchable band pass filter comprising multiple surface acoustic wave filters. The number of surface acoustic wave filters in the filter 58 corresponds to the total number of different transmitter frequency ranges associated with the available cellular carriers. Similarly, the number of surface acoustic wave filters in the filter 60 corresponds to the total number of different receiver frequency ranges associated with the available cellular carriers. Each surface acoustic wave filter is arranged to permit signals in a specified frequency range to pass. Signals outside the specified frequency range are attenuated.

Switching circuitry associated with the surface acoustic wave filters and controlled by the microprocessor 40 connects the appropriate surface acoustic wave filters to the transmitter 50 and receiver 52, respectively, depending on the particular cellular carrier being used in the monitoring and reporting system. For this purpose, a high speed serial link 62 is provided to couple the microprocessor 40 to the cellular transceiver 38. Control signals can be sent along the serial link 62. Data paths 64 are also provided to couple the DSP-based modem 44 to the transmitter 50 and receiver 52, respectively. Audio signals from the DSP-based modem 44 to the transmitter 50, and from the receiver 52 to the DSP-based modem 44, travel along the data paths 64.

In an alternative implementation, instead of switchable band pass filters, voltage-tuned band pass filters can be coupled to the transmitter 50 and receiver 52, respectively. By applying bias voltages through control circuitry, the filters can be tuned to the appropriate frequency ranges corresponding to the particular cellular network to be used in the monitoring and reporting system. Control signals to adjust the bias voltages can be sent from the microprocessor 40 to the cellular transceiver 38 over the serial link 62.

When the telemetry device 22 is initially installed in a vending machine, for example, the DSP-based modem 44 is configured to operate using the protocol associated with a particular one of the available cellular carriers, for example, CDPD. The band pass filters 58, 60 are arranged to correspond to the frequency ranges for transmitting and receiving signals using that cellular carrier. Periodically, for example, once every twenty-four hour period, the telemetry device 22 reports information previously accumulated from the vending machine 2 to the information management system 8 (FIG. 1). For this purpose, the telemetry device 22 also includes a clock which can be, for example, an internal software signal associated with the microprocessor 40. Alternatively, an external chip can be used as the clock.

Figure 3:
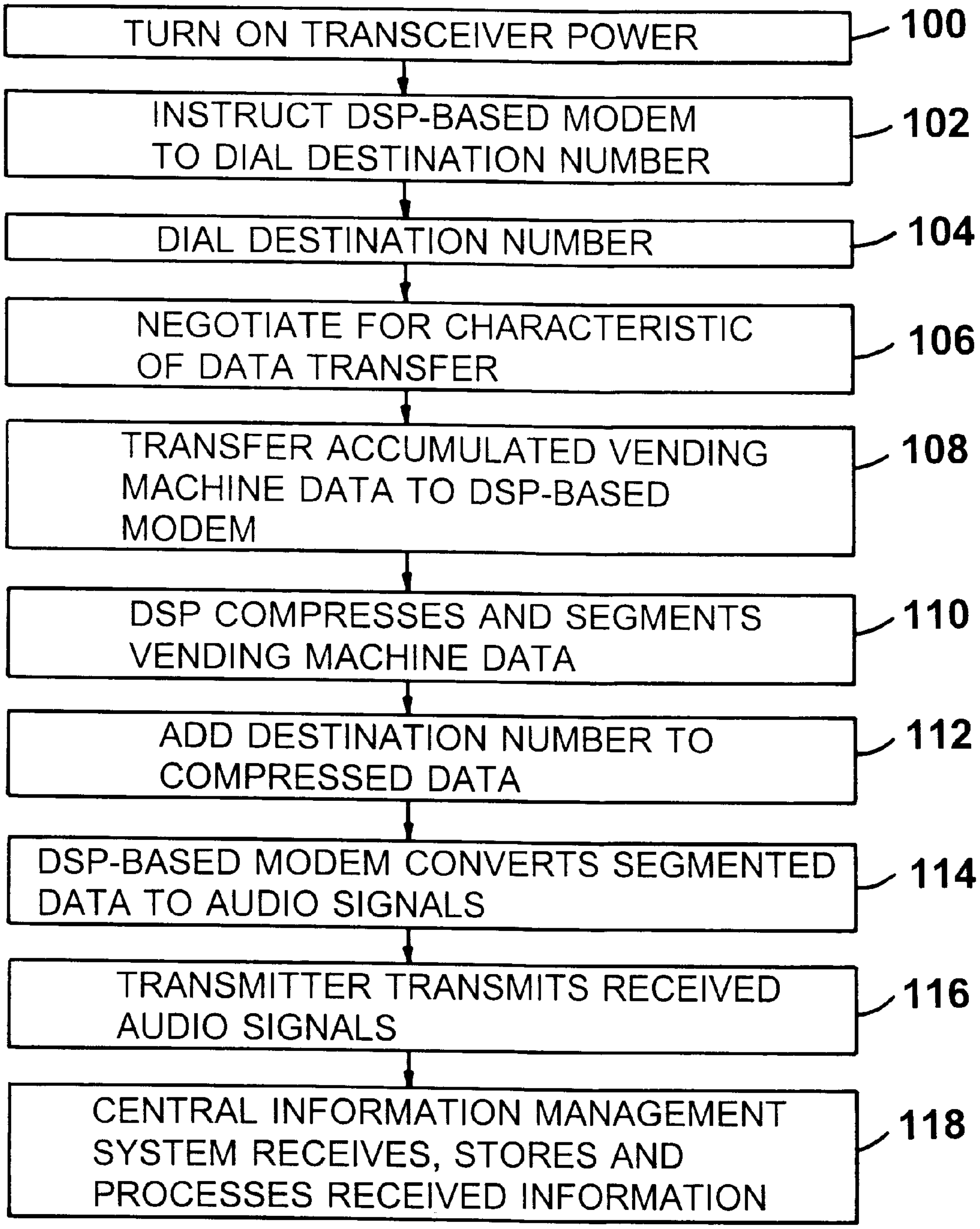
FIG. 3 is a flow chart for a method of reporting information from a vending machine to a central station according to the invention.

FIG. 3 is a flow chart illustrating generally a method for reporting the information to the information management system 8 using one of the available cellular carriers, for example, CDPD. For the purposes of illustration, it is assumed that the cellular network 10 is associated with the CDPD carrier.

As indicated by step 100 in FIG. 3, at the designated time, the microprocessor 40 sends a control signal to the cellular transceiver 38 which turns on or powers up the cellular transceiver. The microprocessor 40 then instructs the DSP-based modem 44 to dial the destination number for the data, as shown in step 102. The telephone number of the information management system 8 is retrieved from memory 42 and the DSP-based modem 44 dials the number, as indicated by step 104. Next, as indicated by step 106, after receiving a dial tone, the DSP-based modem negotiates with an answering modem for the speed and other characteristics of data transfer to be used during the communication according to the CDPD protocol. Then, the previously accumulated information from the vending machine is transferred from the microprocessor to the DSP-based modem in digital format, as shown by step 108.

As indicated by step 110, the DSP-based modem 44 compresses the digital data and segments the compressed data according to a standard protocol. The X.25 protocol, for example, which divides the compressed data into thirty-two byte segments can be used. Also, as indicated by step 112, the destination information is added to the compressed, segmented data. The DSP-based modem 44 then converts the data to audio signals and sends the audio signals to the transmitter 50, as shown in step 114. The transmitter 50 transmits the audio signals over the cellular network 10, and the transmitted signals are subsequently received at the information management system 8, as indicated by step 116. Once the information management system 8 receives data or other information from one or more vending machines, the computer 20 in the system 8 stores and processes the received information, for example, according to a software program or in response to user commands, as indicated by step 118.

Although the method illustrated by the flow chart of FIG. 3 indicates that the telemetry device 22 initiates the communications and transfer of information, the information management system 8 can also initiate communication with the telemetry device 22 and request that the telemetry device 22 transfer the data accumulated by the microprocessor 40. Moreover, although only one information management system 8 is shown in FIG. 1, in some implementations the telemetry device 22 communicates with multiple central stations or hosts, which can include, for example, local or wide area networks.

In addition, in one implementation, each of the vending machines 2, 4 and 6 includes a telemetry device 22 and reports accumulated vending machine data independently of the other vending machines. However, to reduce costs, several vending machines, each of which includes a processing module 36, can be linked to a single cellular receiver 38 residing in one of the vending machines.

Figure 4:
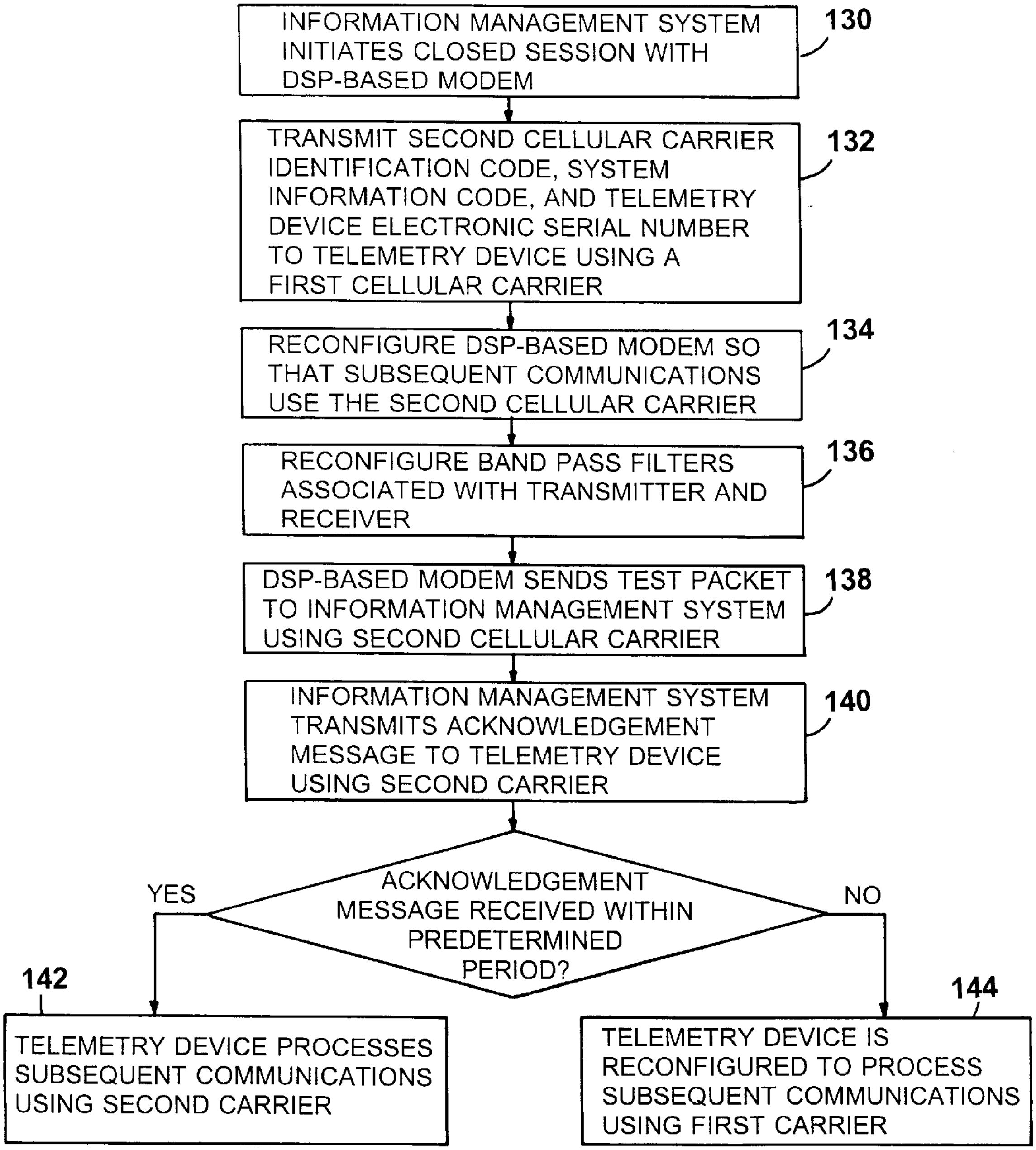
FIG. 4 is a flow chart for a method of switching the cellular carrier used for sending information between the telemetry device in the vending machine and the central station.

FIG. 4 is a flow chart showing a method of changing the cellular carrier used for sending information between the telemetry device 22 in a vending machine, for example, the vending machine 2, and the information management system 8. For purposes of illustration, it is assumed that the monitoring and reporting system currently is using a first cellular carrier and is instructed to switch to a second cellular carrier. Software programs or codes, corresponding to the protocols for the first and second cellular carriers, are stored in the memory 42.

As indicated by step 130 of FIG. 4, the information management system 8 initiates a closed session with the DSP-based modem 44. An appropriate header alerts the DSP-based modem 44 that a closed session is being initiated. Using the first cellular carrier, the information management system 8 transmits a carrier identification code corresponding to the second carrier and a system identification code, as indicated by step 132. In some implementations, the system 8 also transmits an electronic serial number corresponding to the telemetry device 22. The electronic serial number is used to identify the telemetry device 22 when it transmits information using the second cellular carrier. Upon receiving the new carrier identification code and system identification code, the DSP-based modem 44 is automatically reconfigured so that subsequent communications with the information management system 8 use the second cellular carrier, as shown by step 134. In particular, the DSP-based modem 44 will use the code stored in the memory 42 which corresponds to the protocol for the second cellular carrier during subsequent communications. In addition, the band pass filters 58, 60 associated with the transmitter 50 and receiver 52, respectively, are reconfigured to correspond to the appropriate frequency ranges for transmitting and receiving signals using the second carrier, as indicated by step 136. As part of an initialization or set-up routine, the DSP-based modem 44 sends a test packet to the information management system 8 using the second cellular carrier, as indicated by step 138. The test packet is transmitted according to the protocol which corresponds to the second cellular carrier and which is stored in the memory 42. Next, as indicated by step 140, the information management system 8 receives the test packet and transmits an acknowledgement message to the telemetry device 22 using the second carrier. If the telemetry device 22 receives the acknowledgement message within a predetermined period of time following its transmission of the test packet, then, as indicated by step 142, subsequent communications between the telemetry device 22 and the information management system 8 are processed according to the protocol and frequencies associated with the second cellular carrier. On the other hand, if the acknowledgement message is not received within the predetermined period, then, as indicated by step 144, the telemetry device 22 is reconfigured automatically so that subsequent communications to and from the telemetry device 22 continue to be processed according to the protocol and frequencies associated with the first cellular carrier.

Figure 5:
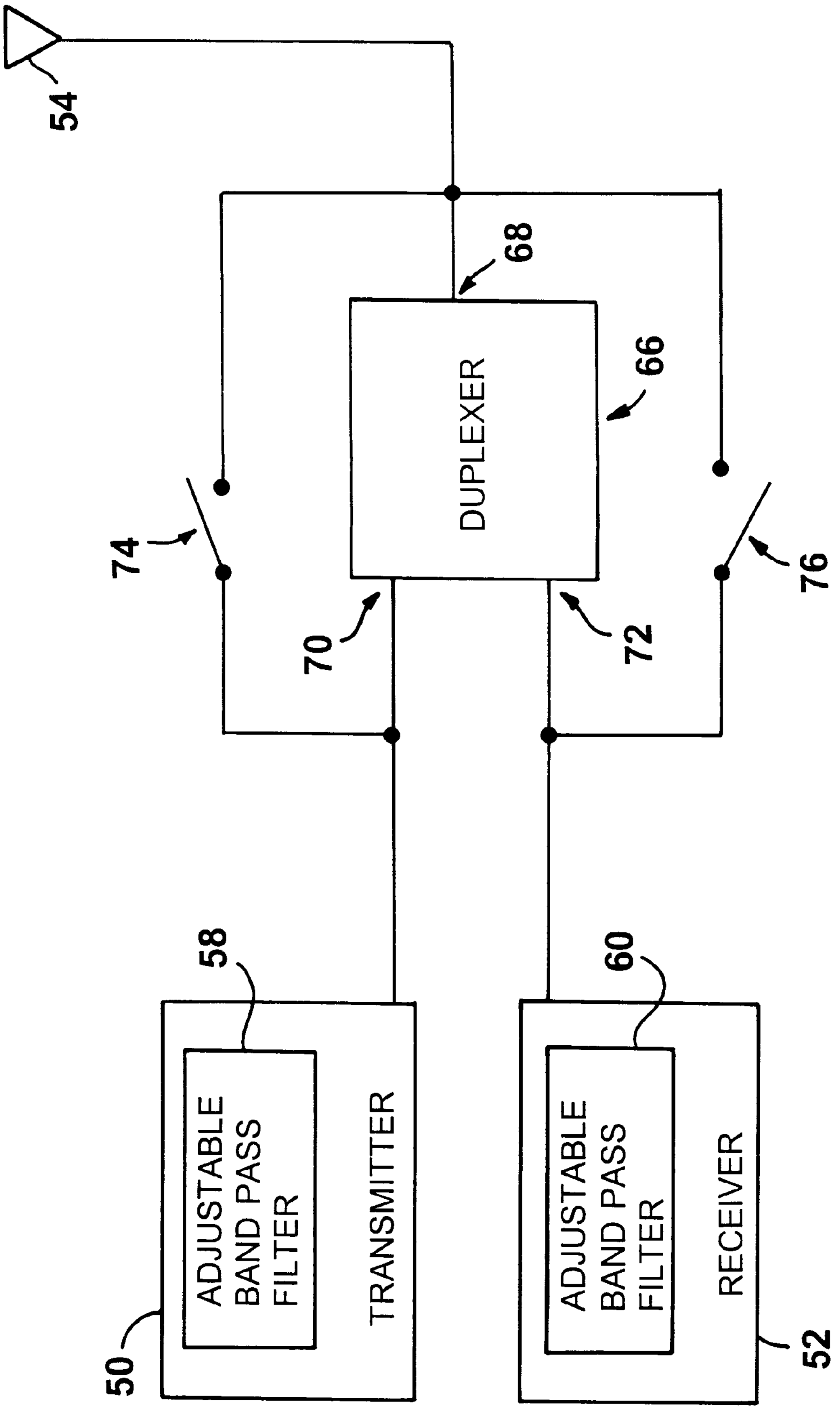
FIG. 5 illustrates an implementation of a cellular transceiver according to the invention.

FIG. 5 illustrates another implementation of the cellular transceiver 38 which allows the telemetry device 22 to transmit and receive information using either half duplex cellular network, such as RAM Mobitex or ARDIS/DATA-TAC, or duplex cellular networks, such as CSC. Duplex systems allow information to be transmitted and received at the same time.

As shown in FIG. 5, the cellular transceiver includes an Advanced Mobile Phone System ("AMPS") duplexer 66. The duplexer 66 is a three terminal device having an antenna port 68, a transmitter port 70 and a receiver port 72. The antenna port 68 has a low impedance to the receiver port 72 at frequencies between 869 and 894 MHz and a high impedance at other frequencies. The antenna port 68 has a low impedance to the transmitter port 70 at frequencies between 824 and 849 MHz and a high impedance at other frequencies.

The antenna 54 is also connected to the transmitter 50 and receiver 52 by switches 74, 76, respectively. In the particular implementation shown, the switches 74, 76 are GaAs single pole single throw switches. When a duplex cellular carrier is used for transmitting and receiving information, the switches 74, 76 are in their respective open states, and the signals flow through the duplexer 66. However, when a half duplex cellular carrier is used, one of the switches 74, 76 is in its open or non-conducting state while the other remains in its closed or conducting state. Specifically, when the cellular transceiver 38 is receiving information transmitted using a half duplex cellular carrier, the switch 76 to the receiver 52 is in its closed state, while the switch 74 to the transmitter 50 remains in its open state. The converse occurs when the cellular transceiver 38 transmits information using a duplex cellular carrier. The position of the switches 74, 76 can be controlled by signals sent from the microprocessor 40 over the serial link 62.

In yet a further implementation, a human perceivable indicator, such as a light emitting diode ("LED") 78 (see FIG. 2), is coupled to the processing module 36. The blink rate of the LED 78 is controlled to provide an indication of the strength of incoming receiver signals. The cellular transceiver 38 is configured to provide a standard receiver signal strength indication ("RSSI") to the microprocessor 40 over serial link 62. The microprocessor 40, or the DSP-based modem 44, converts the RSSI signal to another signal which controls the blink rate of the LED 78. The blink rate can be used by service personnel to adjust the position of the antenna 54 so as to maximize the reception of incoming signals.

Although use of an LED provides a low-cost technique for adjusting the position of the antenna 54, other indicators which provide a variable signal that is perceivable to service personnel can also be used. Such indicators include bar graphs and digital displays, as well as other light emitting device. Sound indicators, in which the loudness or tone of the indicator is controlled by the DSP-based modem 44 or the microprocessor 40, can also be used.

The antenna 54 can be a standard whip antenna, such as those often used in cellular communications. Alternatively, a flat or planar antenna can be designed into the top or side of the vending machine. The planar antenna can be constructed using a combination of slotted aperture grill and micro stripline PCB antenna techniques. Sheet metal is stamped with the apertures, and an etched glass epoxy printed wiring board is positioned behind the apertures. A plate can be provided to cover the planar antenna when it not in use.

The microprocessor 40, or DSP-based modem 44, can also be configured to measure the strength of the noise associated with an incoming signal on an RF channel. The DSP-based modem 44 then uses feedback to adjust the amplitude of the peak-to-peak outgoing audio signal to minimize the noise.

In the implementations discussed above, the telemetry device 22 is provided as a separate unit from other functional units in the vending machine 2, including processing units associated, for example, with bill validation and coin recognition units. Such implementations permit the use of the telemetry device 22 with existing vending machines whose construction may differ from one another. However, the telemetry device 22 need not be a separate unit and can be integrated as a single unit with other functional units of the vending machine. In such implementations, use of the control board 24 may be unnecessary and the microprocessor 40 can be the same microprocessor or other processor or control circuitry that resides in the vending machine and performs other vending machine functions. Moreover, as discussed in greater detail below, such implementations provide a technique for more easily upgrading or modifying software related to other vending machine functions, such as bill validation and coin recognition.

Figure 6:
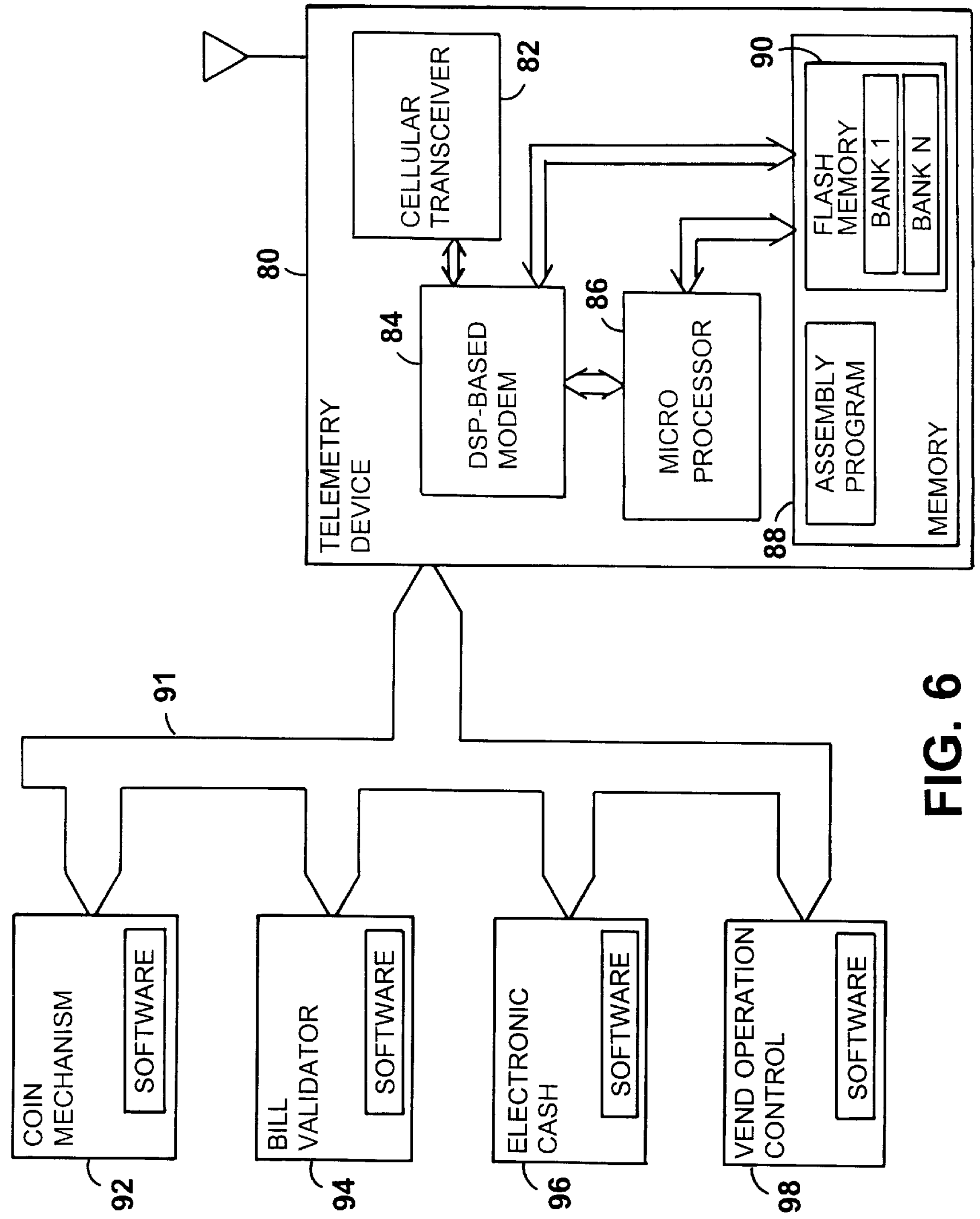
FIG. 6 is a functional block diagram showing selected sub-units of a vending machine including a telemetry device according to the invention.

FIG. 6 is a functional block diagram showing selected sub-units of a vending machine, such as the vending machine 2, which can include a coin mechanism 92, a bill validator 94, an electronic cash device 96 and a vend operation control system 98. Each of the sub-units 92, 94, 96 and 98 includes software or code for performing various functions associated with the vending machine. For example, the coin mechanism and bill validator units 92, 94 test the denomination and validity of coins or bills inserted into the vending machine. Similarly, the electronic cash device performs various validation functions associated with debit cards, credit cards or smart cards used by a customer to purchase an item from the vending machine. The vend operation control system 98 controls the overall vending of products from the vending machine, including such functions as determining whether a requested vend is permitted and controlling vend motors to deliver a requested product. The software or code in each of the sub-units 92, 94, 96 and 98 can be stored in flash memory such as EEPROM.

The vending machine of FIG. 6 also includes a telemetry device 80 which has a transceiver 82, a DSP-based modem 84, a microprocessor 86 and a memory 88. In general, the telemetry device 80 is similar to the telemetry device 22. In addition, the telemetry device 80 can communicate directly to the sub-units 92, 94, 96 and 98 over a bus 91. Furthermore, the memory 88 includes a software assembly program, which can be stored, for example, in ROM. The memory 88 also has flash memory 90 such as EEPROM. The flash memory 90 includes multiple memory banks. Some of the memory banks in the memory 90 are used initially for storing the execution code for the microprocessor 86 and the DSP-based modem 84, respectively. Additional memory banks in the flash memory 90 are used to store software or code received from the information management system 8 and assembled by the DSP-based modem 44, as discussed further below.

The telemetry device 80 is configured to communicate with the information management system 8 using a cellular carrier as described in connection with FIGS. 3–4. Additionally, software or code residing in either the telemetry device 80 or one of the other vending machine units 92, 94, 96 or 98 can be updated, modified or replaced remotely as-shown in the flow chart of FIG. 7. For purposes of illustration, it is assumed in the following discussion that the telemetry device 80 and the information management system 8 are communicating using CDPD. Other cellular carriers, however, can also be used.

Figure 7:
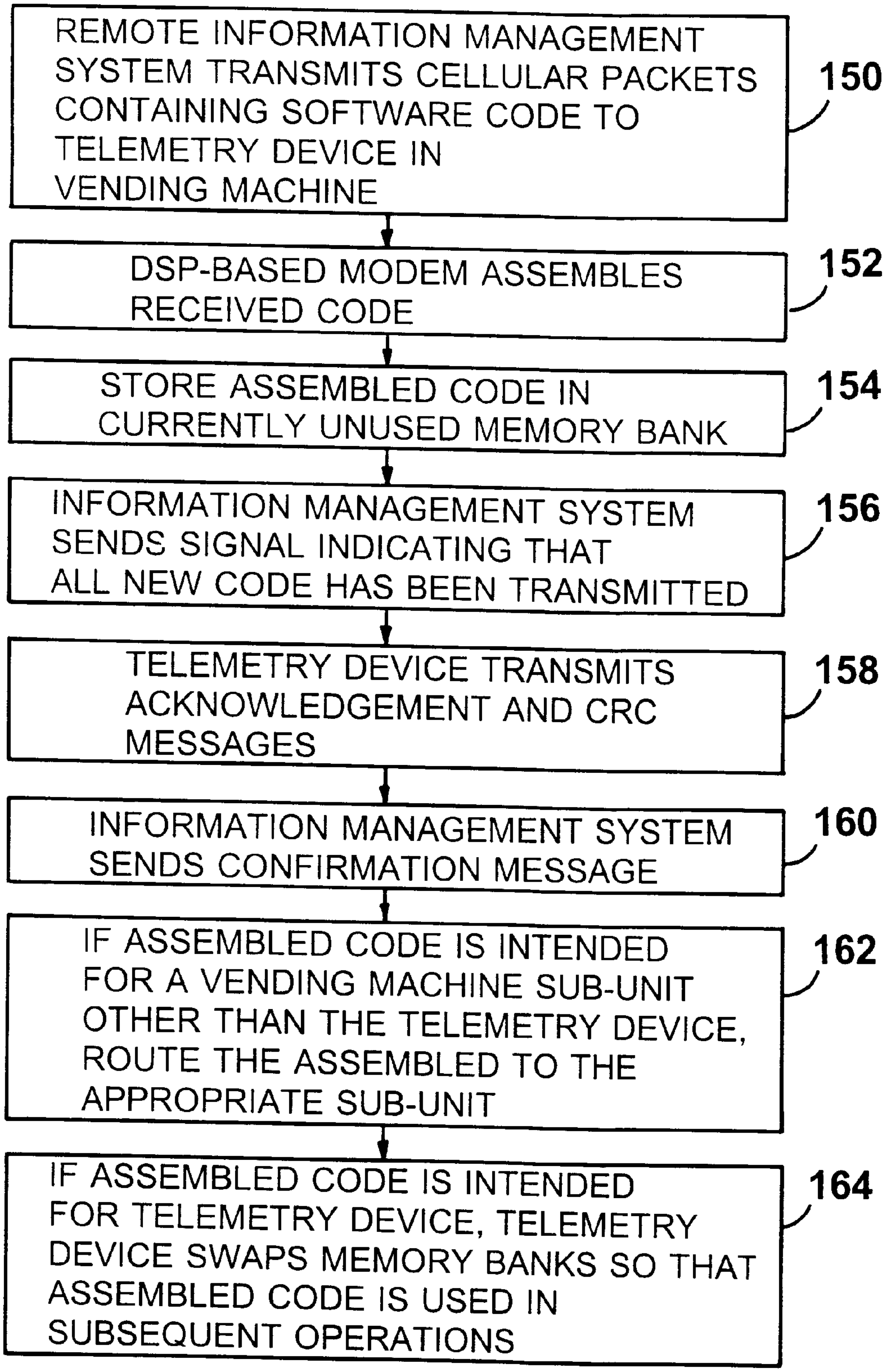
FIG. 7 is a flow chart for a method of upgrading software or other code residing in one of the vending machine sub-units or telemetry device according to the invention.

As indicated by step 150 in FIG. 7, when the information management system 8 wishes to update, modify or replace software code in the vending machine, it transmits packets of fixed length to the telemetry device 80. Each packet includes a portion or segment of the new or modified software code. Appropriate header information signifies to the telemetry device 80 that the received packets contain new or modified code, as well as an identifier indicating whether the transmitted code is intended to modify code for the telemetry device 80 itself or whether the transmitted code is intended to modify the code for one of the vending machine sub-units 92, 94, 96 or 98. As the packets are received, the DSP-based modem 84 assembles the new code according to the assembly program stored in the memory 88, as indicated by step 152. As the code is assembled, it is stored in a currently unused memory bank in the flash memory 90, as indicated by step 154. A final packet or other signal is sent by the information management system 8 to indicate that all the new code has been transmitted, as indicated by step 156.

Once all the packets of code are received and assembled by the telemetry device 80, the telemetry device 80 transmits a acknowledgement message and a cycle redundancy check ("CRC") message to the information management system 8 to confirm receipt of the new code, as indicated by step 158. If the CRC message received by the information management system 8 indicates that the new software has been correctly received by the telemetry device 80, the information management system 8 sends a final confirmation message to the telemetry device 80, as indicated by step 160.

Next, as indicated by step 162, if the new code is destined for one of the vending machine sub-units 92, 94, 96 or 98, the telemetry device 80 routes the assembled software to the appropriate destination sub-unit where the new code is integrated with or replaces existing code associated with the sub-unit, as appropriate. The memory bank used to store the assembled packets of code can then be used for subsequent operations. Although only four sub-units 92, 94, 96 and 98 other than the telemetry device 80 are shown in FIG. 6, the vending machine can include other sub-units whose software or code can be upgraded or otherwise modified in this manner.

If, as indicated by step 164, the new code is intended for use in the operation of the telemetry device 80 itself, then the telemetry device 80 swaps memory banks in the memory 90 so that the newly received and assembled code is used in subsequent operations. The vending machine is, thus, reconfigured so that at least some old software code is no longer accessed during subsequent vending machine operations. The memory bank previously used to store the old code that has been replaced or upgraded can subsequently be used to store newly received and assembled code during subsequent software upgrades.

As the telemetry device 80 performs software upgrades, it keeps track of which sub-unit or sub-units in the vending machine have been upgraded as well as the software revisions received. That information can be stored in non-volatile memory associated with the telemetry device 80. In certain implementations, the telemetry device 80 may be required, for security reasons, to contact another host to request permission prior to performing the software upgrade.

Other implementations are within the scope of the following claims.

What is claimed is:

1. A vending machine capable of communicating with a central station using any one of a plurality of cellular network technologies each of which uses a different protocol for receiving and transmitting signals, the vending machine including a telemetry device comprising a cellular transceiver, a digital signal processor-based modem, and memory storing software corresponding to protocols for each of the cellular network technologies, wherein the telemetry device can be reconfigured, in response to signals received from the central station using a first one of the cellular network technologies, to transmit and receive signals subsequently using a second one of the cellular network technologies.

2. The vending machine of claim 1 comprising a processor configured to accumulate data corresponding to monitored events occurring in the vending machine, wherein the digital signal processor-based modem is configured to transmit the accumulated data to the central station via the cellular transceiver.

3. The vending machine of claim 2 wherein the processor is configured to accumulate data corresponding to monies deposited in and returned from the vending machine.

4. The vending machine of claim 2 wherein the processor is configured to accumulate data corresponding to inventory remaining in the vending machine.

5. The vending machine of claim 2 wherein the processor is configured to accumulate data corresponding to alarm conditions in the vending machine.

6. The vending machine of claim 1 wherein the cellular transceiver comprises an antenna, a transmitter, a receiver, and a switch configured to allow the cellular transceiver to transmit and receive signals using a half duplex carrier.

7. The vending machine of claim 1 wherein the cellular transceiver comprises an antenna, a transmitter, a receiver, and a duplexer configured to allow the cellular transceiver to transmit and receive signals using a duplex carrier.

8. The vending machine of claim 1 wherein the cellular transceiver comprises:

an antenna;

a transmitter;

a receiver;

a duplexer with a first port connected to the antenna, a second port connected to the receiver and a third port connected to the transmitter;

a first switch connected between the antenna and the transmitter; and a second switch connected between the antenna and the receiver, whereby the cellular transceiver can transmit and receive signals using either a duplex or half duplex carrier.

9. A vending machine capable of communicating with a central station using any one of a plurality of cellular network technologies, the vending machine including a telemetry device comprising a cellular transceiver, a digital signal processor-based modem, and memory storing software corresponding to protocols for each of the cellular network technologies, wherein the telemetry device can be reconfigured, in response to signals received from the central station using a first one of the cellular network technologies, to transmit and receive signals subsequently using a second one of the cellular network technologies, and wherein the cellular transceiver comprises frequency band filters which can be adjusted so that the cellular transceiver transmits and receives signals in frequency ranges of a selected one of the cellular network technologies.

10. The vending machine of claim 9 wherein the cellular transceiver comprises a transmitter and a receiver each of which has at least one associated adjustable frequency band filter.

11. The vending machine of claim 10 wherein the frequency band filters comprise a plurality of surface acoustic wave filters.

12. The vending machine of claim 10 wherein the frequency band filters comprise voltage-tuned band pass filters.

13. A monitoring and reporting system comprising: A a central station;

a plurality of vending machines capable of communicating with the central station using any one of a plurality of cellular network technologies each of which uses a different protocol for receiving and transmitting signals, each of the vending machines including a telemetry device comprising a cellular transceiver, a digital signal processor-based modem, and memory storing software corresponding to protocols for each of the cellular network technologies, wherein the telemetry device can be reconfigured, in response to signals received from the central station using a first one of the cellular network technologies, to transmit and receive signals subsequently using a second one of the cellular network technologies.

14. The system of claim 13 wherein each cellular transceiver comprises frequency band filters which can be adjusted so that the cellular transceiver transmits and receives signals in frequency ranges of a selected one of the cellular network technologies.

15. A method of communicating information between a central station and a vending machine comprising a telemetry device, the method comprising:

transmitting an identification code corresponding to a second cellular network technology from the central station to the vending machine using a first cellular network technology, wherein the first and second cellular network technologies use different protocols to receive and transmit signals; and reconfiguring the telemetry device automatically, in response to the act of transmitting, to transmit and receive subsequent communications to and from the central station using the second cellular network technology.

16. The method of claim 15 wherein the act of reconfiguring comprises accessing software code stored in memory in the telemetry device, the stored software code corresponding to a protocol for use with the second cellular network technology.

17. The method of claim 15 wherein the act of reconfiguring comprises adjusting band pass filters associated with a cellular transceiver in the telemetry device.

18. The method of claim 17 wherein the act of adjusting comprises arranging the filters so that the transceiver transmits and receives information on frequencies corresponding to the second cellular network technology.

19. The method of claim 15 further comprising transmitting information from the telemetry device in the vending machine to the central station using the second cellular network technology.

20. The method of claim 15 comprising accumulating data from the vending machine and transmitting the accumulated data to the central station using the second cellular network technology.

21. A vending machine capable of communicating with a central station using a cellular carrier, the vending machine including a telemetry device comprising a cellular transceiver coupled to a digital signal processor-based modem and configured to provide a receiver strength indication signal to the processor-based modem, and an antenna coupled to the cellular transceiver, the vending machine further comprising a human perceivable indicator which generates signals at a rate controlled by the processor-based modem and indicative of the strength of incoming receiver signals.

22. The vending machine of claim 21 wherein the human perceivable indicator is a light emitting device.

23. The vending machine of claim 21 wherein the processor-based modem is configured to measure a strength of noise associated with an incoming signal and to use feedback to adjust the amplitude of a peak-to-peak outgoing signal to reduce the noise.

24. A method of servicing a vending machine capable of communicating with a central station using a cellular carrier, the vending machine including a telemetry device comprising a cellular transceiver and an antenna coupled to the cellular transceiver, the method comprising:

receiving an incoming signal in the cellular transceiver;

generating a receiver signal strength indication based on the received signal;

generating human perceivable signals based on the receiver signal strength indication, wherein a rate of the human perceivable signals is indicative of the strength of incoming receiver signals;

adjusting a position of the antenna based on the human perceivable signals to increase the reception strength of incoming signals;

measuring a strength of noise associated with an incoming signal; and using feedback to adjust the amplitude of a peak-to-peak outgoing signal to reduce the noise.

25. The method of claim 24 wherein the act of generating human perceivable signals comprises controlling a blink rate of a light emitting device based on the receiver signal strength indication.

26. A method of modifying, supplementing or replacing software code residing in memory associated with one of a plurality of sub-units of a vending machine, the method comprising:

transmitting segments of software code from a remote station to a telemetry device in the vending machine using a cellular carrier;

assembling the segments of software code in the telemetry device; and routing the assembled software code to a coin mechanism in the vending machine to update existing software in the coin mechanism.

27. A method of modifying, supplementing or replacing software code residing in memory associated with one of a plurality of sub-units of a vending machine, the method comprising:

transmitting segments of software code from a remote station to a telemetry device in the vending machine using a cellular carrier;

assembling the segments of software code in the telemetry device; and routing the assembled software to a bill validator in the vending machine to update existing software in the bill validator.

28. A method of modifying, supplementing or replacing software code residing in memory in a vending machine, the method comprising:

transmitting segments of software code from a remote station to a telemetry device in the vending machine using a cellular carrier;

assembling the segments of software code in the telemetry device;

storing the assembled software code in a currently unused memory bank of the vending machine;

reconfiguring the vending machine so that at least some old software code is no longer accessed during subsequent vending machine operations, wherein the act of reconfiguring includes swapping memory banks containing the old software code and the assembled software code.

29. A telemetry device for use in a monitoring system, the telemetry device comprising:

a cellular transceiver;

a digital signal processor-based modem; and memory storing software corresponding to protocols for a plurality of cellular network technologies each of which uses a different protocol for receiving and transmitting signals, wherein the telemetry device is configurable to provide monitored information to a central station using a first one of the cellular network technologies, and wherein the telemetry device can be reconfigured, in response to signals received from the central station using the first cellular network technology, to transmit and receive signals subsequently using a second one of the cellular network technologies.

30. The telemetry device of claim 29 wherein the telemetry device is integrated as part of a bill validation unit.

31. The telemetry device of claim 29 wherein the telemetry device is integrated as part of a coin recognition unit.

32. The telemetry device of claim 29 wherein the telemetry device is configured to provide audit information to the central station.

33. The telemetry device of claim 29 wherein the telemetry device is configured for connection to a vending machine.

34. The telemetry device of claim 29 wherein the cellular transceiver comprises an antenna, a transmitter, a receiver, and a switch configured to allow the cellular transceiver to transmit and receive signals using a half duplex carrier.

35. The telemetry device of claim 29 wherein the cellular transceiver comprises an antenna, a transmitter, a receiver, and a duplexer configured to allow the cellular transceiver to transmit and receive signals using a duplex carrier.

36. A telemetry device for use in a monitoring system, the telemetry device comprising:

a cellular transceiver;

a digital signal processor-based modem; and memory storing software corresponding to protocols for a plurality of cellular network technologies, wherein the telemetry device is configurable to provide monitored information to a central station using a first one of the cellular network technologies, and wherein the telemetry device can be reconfigured, in response to signals received from the central station using the first cellular network technology, to transmit and receive signals subsequently using a second one of the cellular network technologies, and wherein the cellular transceiver comprises frequency band filters which are adjustable so that the cellular transceiver transmits and receives signals in frequency ranges of a selected one of the cellular network technologies.

37. The telemetry device of claim 36 wherein the cellular transceiver comprises a transmitter and a receiver each of which has at least one associated adjustable frequency band filter.

38. The telemetry device of claim 37 wherein the frequency band filters comprise a plurality of surface acoustic wave filters.

39. The telemetry device of claim 37 wherein the frequency band filters comprise voltage-tuned band pass filters.

40. A telemetry device for use in a monitoring system, the telemetry device comprising:

a cellular transceiver;

a digital signal processor-based modem; and memory storing software corresponding to protocols for a plurality of cellular network technologies, wherein the telemetry device is configurable to provide monitored information to a central station using a first one of the cellular network technologies, and wherein the telemetry device can be reconfigured, in response to signals received from the central station using the first cellular network technology, to transmit and receive signals subsequently using a second one of the cellular network technologies; and wherein the cellular receiver includes:

an antenna;

a transmitter;

a receiver;

a duplexer with a first port connected to the antenna, a second port connected to the receiver and a third port connected to the transmitter;

a first switch connected between the antenna and the transmitter; and a second switch connected between the antenna and the receiver, whereby the cellular transceiver can transmit and receive signals using either a duplex or half duplex carrier.

* * * * *

UNITED STATES PATENT AND TRADEMARK OFFICE

CERTIFICATE OF CORRECTION

PATENT NO. : 6,038,491
DATED : March 14, 2000
INVENTOR(S) : Patrick McGarry and Philip R. Reger It is certified that error appears in the above-identified patent and that said Letters Patent is hereby corrected as shown below:

Column 10,
Line 53, after "it" insert -- is --.

Column 13,
Line 66, delete "A" after the colon.

Signed and Sealed this

Eighteenth Day of February, 2003

JAMES E. ROGAN
*Director of the United States Patent and Trademark Office*